US012288387B2

(12) United States Patent
Vijayakumar (10) Patent No.: US 12,288,387 B2
(45) Date of Patent: Apr. 29, 2025

(54) METHOD AND SYSTEM FOR TRANSFER LEARNING BASED OBJECT DETECTION

(71) Applicant: Tata Consultancy Services Limited, Mumbai (IN)

(72) Inventor: Senthilkumar Vijayakumar, Coimbatore (IN)

(73) Assignee: Tata Consultancy Services Limited, Mumbai (IN)

( * ) Notice: Subject to any disclaimer, the term of this patent is extended or adjusted under 35 U.S.C. 154(b) by 947 days.

(21) Appl. No.: 17/194,970

(22) Filed: Mar. 8, 2021

(65) Prior Publication Data

US 2021/0295155 A1    Sep. 23, 2021

(30) Foreign Application Priority Data

Mar. 7, 2020   (IN) .............................. 202021009858

(51) Int. Cl.
*G06V 10/82*   (2022.01)
*G06F 18/21*   (2023.01)
(Continued)

(52) U.S. Cl.
CPC ............ *G06V 10/82* (2022.01); *G06F 18/214* (2023.01); *G06F 18/2163* (2023.01);
(Continued)

(58) Field of Classification Search
CPC .... G06V 10/82; G06V 10/774; G06F 18/214; G06F 18/24; G06F 18/2163; G06N 3/096; G06N 3/08; G06N 3/0475
See application file for complete search history.

(56) References Cited

U.S. PATENT DOCUMENTS

2014/0185925 A1   7/2014 Datta et al.
2019/0266442 A1   8/2019 Malur Srinivasan et al.

FOREIGN PATENT DOCUMENTS

CN   109685716 A   4/2019

OTHER PUBLICATIONS

Ghosh et al., "Understanding Deep Learning Techniques for Image Segmentation," 2019, arXiv:1907.06119v1 (Year: 2019).*
(Continued)

*Primary Examiner* — Michael J Huntley
*Assistant Examiner* — Vincent Anton Spraul
(74) *Attorney, Agent, or Firm* — Finnegan, Henderson, Farabow, Garrett & Dunner, LEP (57) ABSTRACT

Image analysis is a vital field since images can provide contextual, environmental, and emotional factors. Conventional methods are facing challenges in analyzing an image accurately when the image is having lesser data or if the image is having less resolution. Conventional machine learning architectures are computationally intensive when run on high power computing devices for training and inference. The present disclosure provides a robust deep learning model to inference in any given environmental condition. Initially, image data is generated using a pre-trained Generative Adversarial Network (GAN). The GAN receives a plurality of images of varying domain and generates image data. The image data is annotated and segmented to obtain a contextual label map. The contextual label map is given as input to a pre-trained transfer learning model to obtain a plurality of image attributes including number of objects and activity performed by each object.

3 Claims, 3 Drawing Sheets

(51) Int. Cl.
    *G06F 18/214*     (2023.01)
    *G06F 18/2431*     (2023.01)
    *G06N 3/048*     (2023.01)
    *G06N 3/08*     (2023.01)
    *G06V 10/774*     (2022.01)

(52) U.S. Cl.
    CPC ......... *G06F 18/2431* (2023.01); *G06N 3/048* (2023.01); *G06N 3/08* (2013.01); *G06V 10/774* (2022.01)

(56) References Cited

OTHER PUBLICATIONS

Shorten et al., "A survey on Image Data Augmentation for Deep Learning," 2019, doi.org/10.1186/s40537-019-0197-0 (Year: 2019).*
Talukdar et al., "Transfer Learning for Object Detection using State-of-the-Art Deep Neural Networks," 2018, 5th International Conference on Signal Processing and Integrated Networks (Year: 2018).*
Ferguson et al., "Detection and Segmentation of Manufacturing Defects with Convolutional Neural Networks and Transfer Learning, " 2018, arXiv:1808.02518v2 (Year: 2018).*
El-Melegy at al., "Automatic Detection of Tuberculosis Bacilli from Microscopic Sputum Smear Images Using Faster R-CNN, Transfer Learning and Augmentation," 2019, IbPRIA 2019, Lecture Notes in Computer Science, vol. 11867 (Year: 2019).*
Cheng et al., "Shelf Commodity Identification Method Based on Hybrid Fully Convolutional Automatic Encoder," 2019, IEEE Access, vol. 7, pp. 169899-169907 (Year: 2019).*

* cited by examiner

METHOD AND SYSTEM FOR TRANSFER LEARNING BASED OBJECT DETECTION

PRIORITY CLAIM

This U.S. patent application claims priority under 35 U.S.C. § 119 to: India application No. 202021009858, filed on Mar. 7, 2020. The entire contents of the aforementioned application are incorporated herein by reference.

TECHNICAL FIELD

The disclosure herein generally relates to the field of object detection and, more particular, to a method and system for transfer learning based object detection.

BACKGROUND

Image analysis, also known as "computer vision" is the ability of computers to recognize attributes within an image. Image analysis is becoming increasingly important since images can provide contextual, environmental, and emotional factors and used by the brands to analyze their brand, products, customers, and competitors.

Conventional methods are facing challenges in analyzing an image accurately when the image data is lesser in subclass classification or if the image is having less resolution. Conventional machine learning architectures are computationally intensive and requires to be run on high power computing devices for training and inference.

SUMMARY

Embodiments of the present disclosure present technological improvements as solutions to one or more of the above-mentioned technical problems recognized by the inventors in conventional systems. For example, in one embodiment, a method for transfer learning based object detection is provided. The method includes receiving a plurality of images, wherein the plurality of images includes low resolution images and high resolution images, wherein each of the plurality of images includes a plurality of objects. Further, the method includes generating an image data corresponding to each of the plurality of images by using a pre-trained Generative Adversarial Network (GAN), wherein the GAN is pre-trained using compressed training images. Furthermore, the method includes computing a contextual label map corresponding to each image data using a pre-trained convolutional auto encoder, wherein computing the contextual label map includes: (i) annotating each of the plurality of objects and an activity associated with each of the plurality of objects and (ii) segmenting the annotated plurality of objects corresponding to each image data to obtain the contextual label map. Finally, the method includes analyzing the contextual label map to obtain a plurality of image attributes using a pre-trained machine learning model, wherein the plurality of image attributes includes number of objects and activity associated with each of the plurality of objects, wherein pre-training the machine learning model including: (i) configuring a transfer learning model based on the contextual label map and (ii) constructing a faster Convolutional Neural Network (CNN) architecture with the configured transfer learning model, wherein the faster CNN is pre-trained until a predefined detection threshold.

In another aspect, a system for transfer learning based object detection is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a plurality of images, wherein the plurality of images includes low resolution images and high resolution images, wherein each of the plurality of images includes a plurality of objects. Further, the one or more hardware processors are configured by the programmed instructions to generate an image data corresponding to each of the plurality of images by using a pre-trained Generative Adversarial Network (GAN), wherein the GAN is pre-trained using compressed training images. Furthermore, the one or more hardware processors are configured by the programmed instructions to compute a contextual label map corresponding to each image data using a pre-trained convolutional auto encoder, wherein computing the contextual label map includes: (i) annotating each of the plurality of objects and an activity associated with each of the plurality of objects and (ii) segmenting the annotated plurality of objects corresponding to each image data to obtain the contextual label map. Further, the one or more hardware processors are configured by the programmed instructions to analyze the contextual label map to obtain a plurality of image attributes using a pre-trained machine learning model, wherein the plurality of image attributes includes number of objects and activity associated with each of the plurality of objects, wherein pre-training the machine learning model includes: (i) configuring a transfer learning model based on the contextual label map and (ii) constructing a faster Convolutional Neural Network (CNN) architecture with the configured transfer learning model, wherein the faster CNN is pre-trained until a predefined detection threshold.

In yet another aspect, a computer program product including a non-transitory computer-readable medium having embodied therein a computer program for method and system for transfer learning based object detection is provided. The computer readable program, when executed on a computing device, causes the computing device to receive a plurality of images, wherein the plurality of images includes low resolution images and high resolution images, wherein each of the plurality of images includes a plurality of objects. Further, the computer readable program, when executed on a computing device, causes the computing device to generate an image data corresponding to each of the plurality of images by using a pre-trained Generative Adversarial Network (GAN), wherein the GAN is pre-trained using compressed training images. Furthermore, the computer readable program, when executed on a computing device, causes the computing device to compute a contextual label map corresponding to each image data using a pre-trained convolutional auto encoder, wherein computing the contextual label map including: (i) annotating each of the plurality of objects and an activity associated with each of the plurality of objects and (ii) segmenting the annotated plurality of objects corresponding to each image data to obtain the contextual label map. Finally, the computer readable program, when executed on a computing device, causes the computing device to analyze the contextual label map to obtain a plurality of image attributes using a pre-trained machine learning model, wherein the plurality of image attributes including number of objects and activity associated with each of the plurality of objects, wherein pre-training the machine learning model includes: (i) configuring a transfer learning model based on the contextual label map and (ii) constructing a faster Convolutional Neural Network (CNN) architecture with the configured transfer learning model, wherein the faster CNN is pre-trained until a predefined detection threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for transfer learning based object detection to accurately detect one or more objects in an image or a video. The system for transfer learning based object detection provides a robust deep learning model to inference in any given environment/ background. Initially, image data is generated using a pre-trained Generative Adversarial Network (GAN). The GAN receives a plurality of images of varying domain and generates image data. The image data is annotated and segmented to obtain a contextual label map. The contextual label map is given as input to a pre-trained transfer learning model to obtain a plurality of image attributes including number of objects and activity performed by each object. Here, the object constitutes both living and non-living things appearing in the plurality of images or video.

Referring now to the drawings, and more particularly to FIG. 1 through 4, where similar reference characters denote corresponding features consistently throughout the figures, there are shown preferred embodiments and these embodiments are described in the context of the following exemplary system and/or method.

Figure 1:
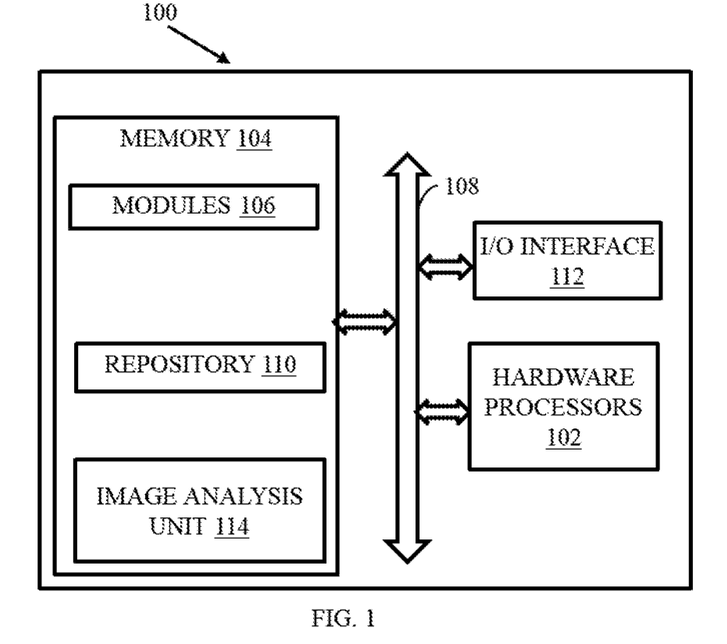
FIG. 1 is a functional block diagram of a system for transfer learning based object detection, according to some embodiments of the present disclosure.

FIG. 1 is a functional block diagram of a system 100 for transfer learning based object detection, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server.

The one or more hardware processors 102 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and an image analysis unit 114. The memory 104 also includes a data repository 110 for storing data processed, received, and generated by the plurality of modules 106 and the image analysis unit 114.

The plurality of modules 106 include programs or coded instructions that supplement applications or functions performed by the system 100 for transfer learning based object detection. The plurality of modules 106, amongst other things, can include routines, programs, objects, components, and data structures, which perform particular tasks or implement particular abstract data types. The plurality of modules 106 may also be used as, signal processor(s), state machine (s), logic circuitries, and/or any other device or component that manipulates signals based on operational instructions. Further, the plurality of modules 106 can be used by hardware, by computer-readable instructions executed by a processing unit, or by a combination thereof. The plurality of modules 106 can include various sub-modules (not shown). The plurality of modules 106 may include computer-readable instructions that supplement applications or functions performed by the system 100 for transfer learning based object detection.

The data repository 110 may include a plurality of abstracted piece of code for refinement and data that is processed, received, or generated as a result of the execution of the plurality of modules in the module(s) 106 and the modules associated with the image analysis unit 114. The data repository may also include training images and test images.

Although the data repository 110 is shown internal to the system 100, it will be noted that, in alternate embodiments, the data repository 110 can also be implemented external to the computing device 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2:
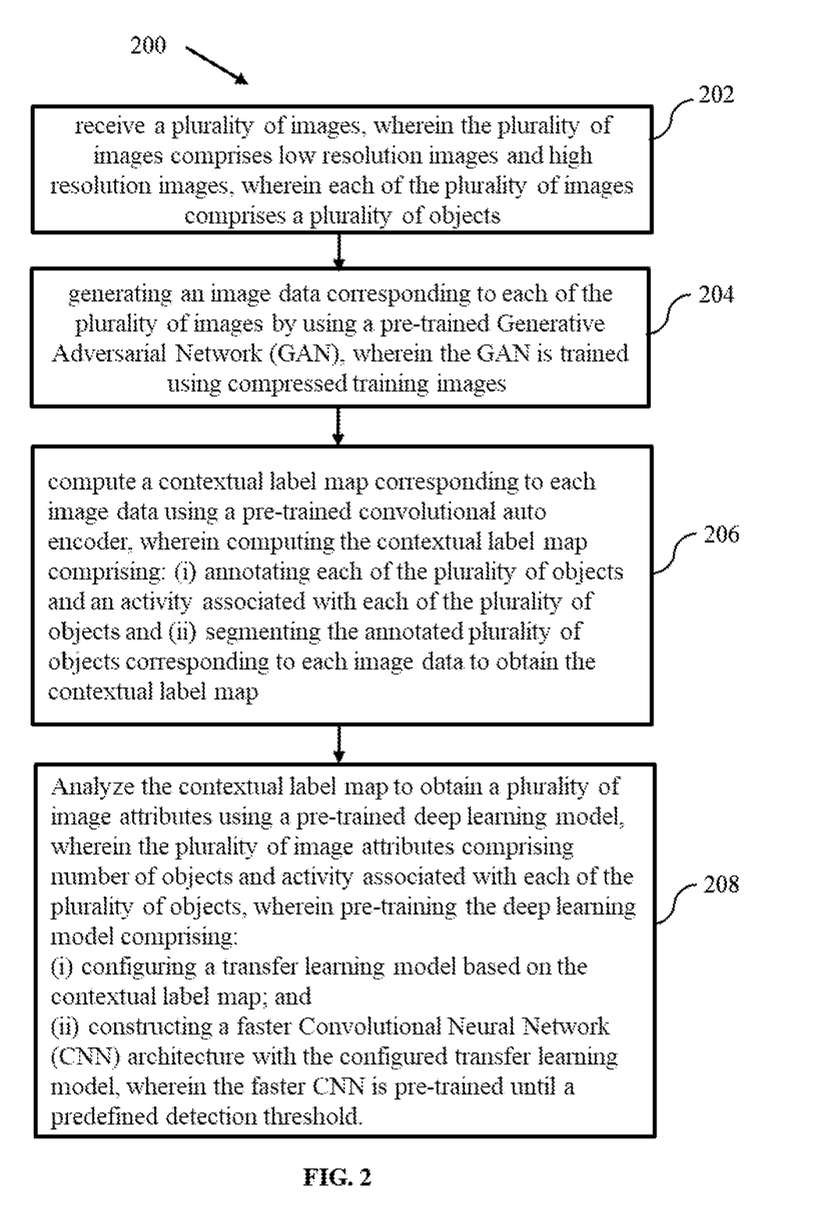
FIG. 2 is an exemplary flow diagram for a method for transfer learning based object detection implemented by the system of FIG. 1, in accordance with some embodiments of the present disclosure.
Figure 3:
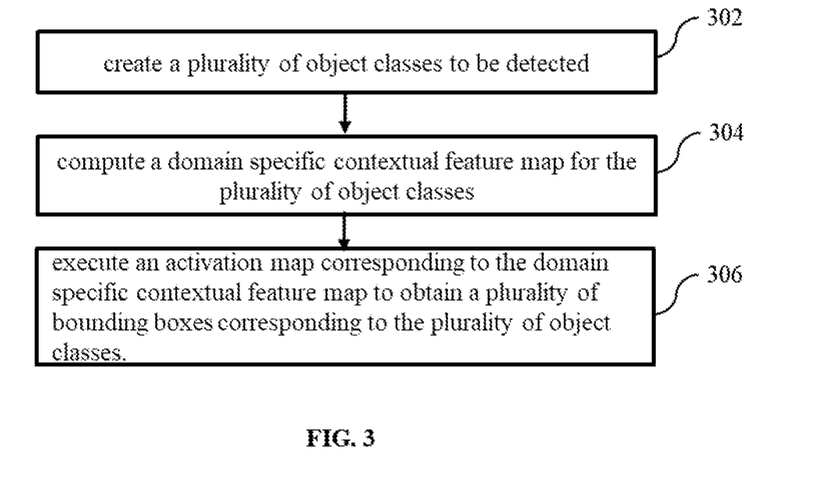
FIG. 3 is a detailed flow chart for the step, configuring the transfer learning model, of the method for transfer learning based object detection, in accordance with some embodiments of the present disclosure.
Figure 4:
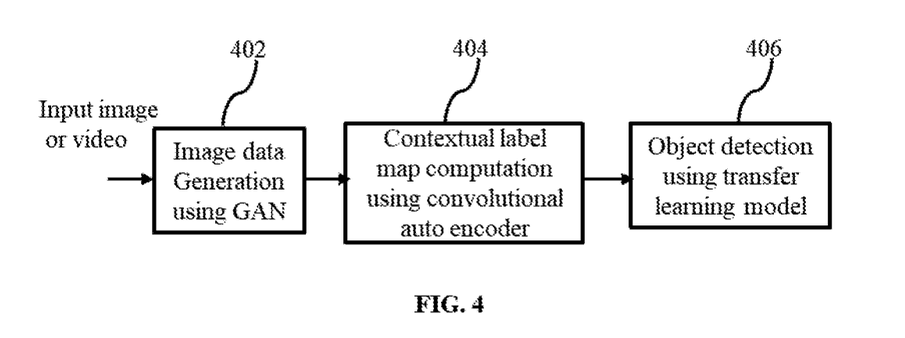
FIG. 4 illustrates a functional block diagram of the system of FIG. 1 for transfer learning based object detection, in accordance with some embodiments of the present disclosure.

FIG. 2 is exemplary flow diagram for a processor implemented method for transfer learning based object detection implemented by the system of FIG. 1, according to some embodiments of the present disclosure. In an embodiment, the system 100 comprises one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2-4. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors (102) receive a plurality of images, wherein the plurality of images includes low resolution images and high resolution images, wherein each of the plurality of images includes a plurality of objects.

At step 204 of the method 200, the one or more hardware processors (102) generate an image data corresponding to each of the plurality of images by using a pre-trained Generative Adversarial Network (GAN), wherein the plurality of images are compressed prior to training, i.e., the GAN is trained using compressed images. The image data generated by the pre-trained GAN includes images in varying orientation, illumination changes, background variation, scale variation, view point variation, deformation, occlusion changes, background clutter, emotional variation, interclass variation and intraclass variation.

At 206 of the method 200, the one or more hardware processors (102) computes a contextual label map corresponding to image data associated with each image using a pre-trained convolutional auto encoder, wherein the steps for computing the contextual label map are: (i) annotating each of the plurality of objects and an activity associated with each of the plurality of objects and (ii) segmenting the annotated plurality of objects corresponding to each image data to obtain the contextual label map.

At 208 of the method 200, the one or more hardware processors (102) analyzes the contextual label map to obtain a plurality of image attributes using a pre-trained deep learning model, wherein the plurality of image attributes includes number of objects and activity associated with each of the plurality of objects, wherein the steps for pre-training the deep learning model are: (i) configuring a transfer learning model based on the domain specific contextual label map and (ii) constructing a faster Convolutional Neural Network (CNN) architecture with the configured transfer learning model, wherein the faster CNN is pre-trained until a predefined detection threshold is obtained. The method of configuring the transfer learning model includes the following steps: (i) creating a plurality of object classes to be detected (ii) computing a domain specific contextual feature map for the plurality of object classes and (iii) executing an activation map corresponding to the domain specific contextual feature map to obtain a plurality of bounding boxes corresponding to the plurality of object classes.

FIG. 3 is exemplary flow diagrams for the method for configuring the transfer learning model of the processor implemented method for transfer learning based object detection implemented by the system of FIG. 1, according to some embodiments of the present disclosure. At step 302, the plurality of object classes to be detected are created. At step 304, the domain specific contextual feature map for the plurality of object classes is computed. At step 306, the activation map corresponding to the domain specific contextual feature map is executed to obtain a plurality of bounding boxes corresponding to the plurality of object classes.

FIG. 4 illustrates a functional block diagram of the system of FIG. 1 for transfer learning based object detection, in accordance with some embodiments of the present disclosure. Now referring to FIG. 4, the functional block diagram includes a module for image data generation using GAN 402, a module for contextual label map generation using convolutional auto encoder 404 and a module for object detection using transfer learning 406. In an embodiment, the modules 402, 403 and 404 are present inside the image analysis unit 114.

In an embodiment, high resolution images and low resolution images from different domains are given as input to the module for data generation using GAN 402 and the GAN generates the image data with variety and variation. For example, the GAN generates images with varying orientation, illumination changes, background variation, scale variation, view point variation, deformation, occlusion changes, background clutter, emotional variation, interclass variation and intraclass variation. For example, the GAN can generate images with all possible variations which provides accurate detection of objects present in the image.

In an embodiment, the module for contextual label map generation using convolutional auto encoder 404 performs image annotation followed by segmentation. Here, an activity/context associated with each of the plurality of objects are annotated and further segmented to obtain the contextual label map. For example, the contextual image annotation can be a helmet, a presenting person and the like.

In an embodiment, the annotation or coordinates of each of the plurality of objects in the image date is saved in an .xml file containing the label data for each of the plurality of images. Further, the xml files are utilized to generate TFRecords (Tensor Flow Records), which are one of the inputs to a Tensor Flow trainer.

In an embodiment, the module for object detection using transfer learning 406 detects the plurality of image attributes using the pre-trained deep learning model. The plurality of image attributes includes number of objects and activity associated with each of the plurality of objects. In an embodiment, the deep learning model is a transfer learning based faster Convolutional Neural Network (faster CNN). The transfer learning model for object detection is built by transferring the learnt knowledge from a pre-trained deep learning model which is trained with large data set (for example, the faster CNN in the present disclosure) for object detection to another machine learning model with new capability (domain specific contextual feature map is the new capability in the present disclosure) of object detection. This reduces the time required for training from the scratch and increases the accuracy of object detection.

The image analysis unit 114, executed by the one or more processors of the system 100, receives the plurality of images, wherein the plurality of images includes low resolution images and high resolution images, wherein each of the plurality of images includes the plurality of objects to be identified. Here the images from different domains are given as input to the system. For example, identifying people occupancy in meeting rooms, monitoring resource usage, event detection and the like.

Further, the image analysis unit 114, executed by one or more processors of the system 100, generates the image data corresponding to each of the plurality of images by using the pre-trained Generative Adversarial Network (GAN), wherein the plurality of images are compressed prior to training to make training faster. The pre-training of GAN includes the following steps: resizing the plurality of input images, image compression, image jittering, generator construction, discriminator construction, defining optimizer and loss function and training.

In an embodiment, size of each of the plurality of input images are standardized to 256*256 image size and jpg format. Further, the resized images are compressed to 10 KB size, so that the pixel matrix is small in size and bigger batch size can be given for deep neural network training, which speeds up the training computation. For example, BUFFER_SIZE=200 and BATCH_SIZE=10. Further, image jittering is applied on the compressed images in 3 steps: (i) Resize an image to bigger height and width, for example, resizing to 286×286×3 (ii) Randomly crop to the original size, for example, randomly cropping to 256×256×3 and (iii) Randomly flip the image horizontally, for example, random mirroring technique.

In an embodiment, "U-Net" based architecture is chosen for generator construction and convolutional "PatchGAN" classifier is used for constructing discriminator. Each block in the encoder of the generator includes 2D Convolutional layer which is Batch Normalized with Leaky ReLU (Rectified Linear Unit) activation function. Each block in the decoder of the generator is transposed to 2D Convolutional layer with Batch Normalization and Dropout applied to the first 3 blocks with ReLU activation function. There are skip connections between the encoder and decoder (as in U-Net)- with Down sampling through the model and Up sampling and establishing the skip connections.

In an embodiment, the discriminator is a PatchGAN discriminator. Each block in the discriminator includes 2D Convolutional layer which is Batch Normalized with Leaky ReLU activation function. Each 50×50 patch of the output classifies a 50×50 portion of the input image (such an architecture is called a PatchGAN). Discriminator receives 2 inputs, for example, the input image and the target image, which it should classify as real. Input image and the generated image (output of generator), which it should classify as fake.

In an embodiment, the generator loss of the GAN is a sigmoid cross entropy loss of the generated images and an array of ones. L1 loss which is MAE (mean absolute error) between the generated image and the target image. This allows the generated image to become structurally similar to the target image. The formula to calculate the total generator loss=GAN_loss+LAMBDA*l1_loss, where LAMBDA=200.

In an embodiment, the discriminator loss function of the GAN takes 2 inputs including real images and generated images. Here, real_loss is a sigmoid cross entropy loss of the real images and an array of ones (since these are the real images). The generated_loss is a sigmoid cross entropy loss of the generated images and an array of zeros (since these are the fake images). Then the total_loss is the sum of real_loss and the generated_loss.

In an embodiment, the GAN is trained as follows: The GAN is executed for a plurality of iterations over the image dataset (EPOCHS=200). The training is very fast due to the compression of images, for example, the results produced took 3 hours of training on a single Quadro® Nvidia® GPU. The generator receives the plurality of input images and outputs a generated output. The discriminator receives the the plurality of input images and the generated image as the first input. The second input is the plurality of input images and the target_image. Further, the generator and the discriminator loss is calculated. Further, gradients of loss corresponding to both the generator and the discriminator variables (inputs) are calculated. The calculated generator and the discriminator loss are applied to the optimizer.

Further, the image analysis unit 114, executed by one or more processors of the system 100, computes the contextual label map corresponding to each image data using the pre-trained convolutional auto encoder, wherein the steps for computing the contextual label map are: (i) annotating each of the plurality of objects and an activity associated with each of the plurality of objects, for example, helmet, presenting person and (ii) segmenting the annotated plurality of objects corresponding to each image data to obtain the contextual label map.

Further, the image analysis unit 114, executed by one or more processors of the system 100, analyzes the contextual label map to obtain the plurality of image attributes using the pre-trained deep learning model, for example, the faster CNN. The plurality of image attributes includes number of objects and activity associated with each of the plurality of objects, wherein pre-training the faster CNN includes the following steps: (i) configuring a transfer learning model based on the contextual label map and constructing the faster Convolutional Neural Network (CNN) architecture with the configured transfer learning model, wherein the faster CNN is pre-trained until the predefined detection threshold.

The method of configuring the transfer learning model includes the following steps: (i) creating the plurality of object classes to be detected (ii) computing the domain specific contextual feature map for the plurality of object classes and (iii) executing the activation map corresponding to the domain specific contextual feature map to obtain the plurality of bounding boxes corresponding to the plurality of object classes. The domain specific contextual feature map is computed by using Convolutional Neural Network (CNN)

and execution of activation map is performed by using Region Proposal Network (RPN) which outputs the bounding boxes. The RPN use pre-trained CNN models to extract image features, for example the domain specific contextual feature map. The feature map obtained from the first layer is domain specific contextual feature map. Here Faster-RCNN-Inception-V2 is used as pre-trained model. The shape of the domain specific contextual feature map is represented as height, width, 1532. The height and width is not fixed because image height and width is fixed. by feeding the 333×500 image. The output of the first layer is having a 1st layer feature map with shape (9, 14, 1532). The 2nd layer feature map is also having similar shape as like the first layer. For brevity of description, the terms "domain specific contextual feature map" and "feature map" are used interchangeably throughout the document.

In an embodiment, the construction of the faster CNN is performed as follows: the first layer of the faster CNN is the input layer and the domain specific contextual feature map from the configured transfer learning model is given as input to the input layer of the faster CNN. The second layer of the faster CNN is a 3×3 convolution layer. The second layer is controlling receptive field. Each 3×3 tile in 1st layer will map to one point in activation feature map. In another word, each point of output is representing (3, 3) block of 1st layer feature map and eventually to a big tile of original image. To distinguish with 1st layer domain specific contextual feature map, let the output of 2nd layer be named as activation feature map. The points in the activation feature map/activation map is called feature map point and each point have shape (1, 1, 1532). The third layer of the faster CNN is the output layer. Following the second layer, there have two sibling output layers, first one have 1*9 unit output. Here 9 is the anchor number or a constant number. The 1*9 represent the label of each anchor and 1 means the anchors proposal region is foreground, 0 is background, −1 means ignore this anchor. The second output have 4*9 units, which represent the bounding boxes of anchors. The 4 values used for transforming the loss function are NOT xmin, ymin, xmax and ymax.

The fourth layer of the faster CNN is the configured transfer learning model implemented using RPN. Further, stride calculation is performed by the faster CNN. Overall stride between feature map with shape (9, 14, 1532) and original image with shape (333, 500, 3) can be calculated using the feature map. The stride for height and width is not fixed and can change from image to image, for this 333×500 image, we have stride (37, 35.7). With the stride, the original image is split into a plurality of tiles. In an embodiment, the plurality of tiles are utilized to create anchors. NOT means a feature map point receptive field is same as a tile. The 1st layer feature map point have much bigger receptive field than the tile. The 2nd layer feature map point have even bigger receptive field. After obtaining the tiles, the anchors can be introduced. For each tile, there have several fixed size and shape box drawn on it and those boxes are called "anchors". The anchors are pre-defined and not trainable. The number, shape and size of anchors can be tuned manually, in this example, the scale (3, 6, 12) is used.

Further, subsampling of labels is performed. The fg/bg (foreground and background colors) numbers are much bigger than a batch size (e.g. 256), and hence random down sampling is performed. Further, bg samples number is much bigger than fg samples, that will make bias towards bg samples, so there is a need to keep fg/bg ratio below fg sample. Further, a mini batch data is prepared with the down sampled anchors and feature map point position for each anchor sample is calculated. The feature map position is used to form the mini-batch. For example, an anchor sample having an index 150 when divided by 9 get integer 16. This 16 represents a point (1,2), the second row, third column point in feature map. Similarly, a plurality of mini batch related feature map point locations are calculated. Further, labeling and bounding box construction is performed. Each feature map point is correlated to 9 base anchors. The target label batch have shape (batch_size, 1, 1, 9). The target bounding box batch have shape (batch_size, 1, 1, 4*9).

In an embodiment, the present disclosure can be implemented for Asset monitoring and management in power and infrastructure companies. Here, the asset monitoring is performed by deploying drones with cameras to capture data for inspection.

In another embodiment, the present disclosure can be used for worker safety compliance for detecting whether the workers are wearing safety helmets and jackets.

In another embodiment, the present disclosure can be used for Swachh Bharat Mission to detect garbage and cows feeding on them in streets to alarm the authorities and further to detect froth formation and garbage detection in water bodies.

In another embodiment, the present disclosure can be used to inspect surface quality of steel surface. Defects on the surface of steel plates are one of the most important factors affecting the quality of steel plates and the present disclosure can detect the defects in real time.

In another embodiment, the present disclosure can check the occupancy usage and events in meeting rooms. Further, the present disclosure can be used to detect the road traffic by counting the number of vehicles from the corresponding captured images. Further, the present disclosure can be used in product engagement. For example, Customer Vs Employee Vs Product engagement detection in retail stores.

In another embodiment, the present disclosure can be used to diagnose diseases. The system 100 can receive Computed Tomography (CT) images and X-ray images of a subject under test as input and help the medical practitioners to diagnose diseases. For example, the system 100 receives the CT scan images of lungs and X-ray images of chest and decides whether the subject under test is affected by COVID 19 (Corona Virus Disease 2019) based on conspicuous ground-glass opacity lesions in the peripheral and posterior lungs.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of object detection using GAN and transfer learning in an accurate manner. The GAN generated image data is further processed by a domain knowledge based transfer learning model to provide accurate detection of objects in video or image. Further, the present disclosure can be applied in predicting occupational and lifetime events and travel interests through user's social media images. Furthermore, the present disclosure can detect and predict traffic congestion, track brand mentions more accurately, improve sentiment analysis, identify moments of consumption, perform motion and intrusion detection, perform facial recognition, perform number plate reading, used for counting people, used to detect meeting room occupancy and event detection, used for dwell time monitoring for retail stores, detecting cracks in metal plates and to analyze shopping interest of users. Further, the present disclosure can be used for recognizing long line and checkouts and sending alerts.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method to detect a plurality of objects in a plurality of images, the method comprising:
   receiving, by one or more hardware processors, the plurality of images, wherein the plurality of images comprises low resolution images and high resolution images, wherein each of the plurality of images comprises the plurality of objects, wherein the plurality of images are pertaining to different domains, and wherein the different domains comprises identifying people occupancy in meeting rooms, monitoring resource usage or event detection;
   generating, by the one or more hardware processors, an image data corresponding to each of the plurality of images by using a pre-trained Generative Adversarial Network (GAN), wherein the GAN is pre-trained using a plurality of compressed training images;
   computing, by the one or more hardware processors, a contextual label map corresponding to each image data using a pre-trained convolutional auto encoder, wherein the contextual label map is a domain specific contextual label map, wherein the image data, corresponding to each of the plurality of images, generated by the pre-trained GAN comprises images in at least one of varying orientation, illumination changes, background variation, scale variation, view point variation, deformation, occlusion changes, background clutter, emotional variation, interclass variation and intraclass variation, wherein computing the contextual label map comprising:
      annotating each of the plurality of objects and an activity associated with each of the plurality of objects; and
      segmenting the annotated plurality of objects corresponding to each image data to obtain the contextual label map; and
   analyzing, by the one or more hardware processors, the contextual label map to obtain a plurality of image attributes using a pre-trained deep learning model for detection of objects in the plurality of images, wherein the plurality of image attributes comprising number of objects and activity associated with each of the plurality of objects, wherein pre-training the deep learning model comprises:
   configuring a transfer learning model based on the contextual label map, wherein configuring the transfer learning model comprises:
      creating a plurality of object classes to be detected;
      computing a domain specific contextual feature map for the plurality of object classes;

executing an activation map corresponding to the domain specific contextual feature map to obtain a plurality of bounding boxes corresponding to the plurality of object classes; and constructing a faster Convolutional Neural Network (CNN) architecture with the configured transfer learning model, wherein the faster CNN is pre-trained until a predefined detection threshold, wherein the construction of the faster CNN is performed by:
  a first layer of the faster CNN is an input layer and the domain specific contextual feature map from the transfer learning model given as input to the input layer of the faster CNN;
  a second layer of the faster CNN is a convolution layer, wherein the second layer is controlling a receptive field, wherein the second layer is an activation feature map;
  a third layer of the faster CNN is an output layer, wherein the output layer comprises two sibling output layers;
  a fourth layer of the faster CNN is the transfer learning model, wherein the fourth layer is implemented using a Region Proposal Network (RPN).

2. A system to detect a plurality of objects in a plurality of images, comprising:
  at least one memory storing programmed instructions;
  one or more Input/Output (I/O) interfaces; and
  one or more hardware processors operatively coupled to the at least one memory, wherein the one or more hardware processors are configured by the programmed instructions to:
    receive the plurality of images, wherein the plurality of images comprises low resolution images and high resolution images, wherein each of the plurality of images comprises the plurality of objects, wherein the plurality of images are pertaining to different domains, and wherein the different domains comprises identifying people occupancy in meeting rooms, monitoring resource usage or event detection;
    generate an image data corresponding to each of the plurality of images by using a pre-trained Generative Adversarial Network (GAN), wherein the GAN is pre-trained using a plurality of compressed training images;
    compute a contextual label map corresponding to each image data using a pre-trained convolutional auto encoder, wherein the contextual label map is a domain specific contextual label map, wherein the image data, corresponding to each of the plurality of images, generated by the pre-trained GAN comprises images in at least one of varying orientation, illumination changes, background variation, scale variation, view point variation, deformation, occlusion changes, background clutter, emotional variation, interclass variation and intraclass variation, wherein computing the contextual label map comprising:
      annotating each of the plurality of objects and an activity associated with each of the plurality of objects; and
      segmenting the annotated plurality of objects corresponding to each image data to obtain the contextual label map; and
    analyze the contextual label map to obtain a plurality of image attributes using a pre-trained deep learning model for detection of objects in the plurality of images, wherein the plurality of image attributes comprising number of objects and activity associated with each of the plurality of objects, wherein pre-training the deep learning model comprises:
      configuring a transfer learning model based on the contextual label map, wherein configuring the transfer learning model comprises:
        creating a plurality of object classes to be detected;
        computing a domain specific contextual feature map for the plurality of object classes;
        executing an activation map corresponding to the contextual feature map to obtain a plurality of bounding boxes corresponding to the plurality of object classes; and
        constructing a faster Convolutional Neural Network (CNN) architecture with the configured transfer learning model, wherein the faster CNN is pre-trained until a predefined detection threshold, wherein the construction of the faster CNN is performed by:
          a first layer of the faster CNN is an input layer and the domain specific contextual feature map from the transfer learning model given as input to the input layer of the faster CNN;
          a second layer of the faster CNN is a convolution layer, wherein the second layer is controlling a receptive field, wherein the second layer is an activation feature map;
          a third layer of the faster CNN is an output layer, wherein the output layer comprises two sibling output layers;
          a fourth layer of the faster CNN is the transfer learning model, wherein the fourth layer is implemented using a Region Proposal Network (RPN).

3. One or more non-transitory machine readable information storage mediums comprising one or more instructions to detect a plurality of objects in a plurality of images, which when executed by one or more hardware processors causes:
  receiving the plurality of images, wherein the plurality of images comprises low resolution images and high resolution images, wherein each of the plurality of images comprises the plurality of objects, wherein the plurality of images are pertaining to different domains, and wherein the different domains comprises identifying people occupancy in meeting rooms, monitoring resource usage or event detection;
  generating an image data corresponding to each of the plurality of images by using a pre-trained Generative Adversarial Network (GAN), wherein the GAN is pre-trained using a plurality of compressed training images;
  computing a contextual label map corresponding to each image data using a pre-trained convolutional auto encoder, wherein the contextual label map is a domain specific contextual label map, wherein the image data, corresponding to each of the plurality of images, generated by the pre-trained GAN comprises images in at least one of varying orientation, illumination changes, background variation, scale variation, view point variation, deformation, occlusion changes, background clutter, emotional variation, interclass variation and intraclass variation, wherein computing the contextual label map comprising:
    annotating each of the plurality of objects and an activity associated with each of the plurality of objects; and segmenting the annotated plurality of objects corresponding to each image data to obtain the contextual label map; and analyzing the contextual label map to obtain a plurality of image attributes using a pre-trained learning model for detection of objects in the plurality of images, wherein the plurality of image attributes comprising number of objects and activity associated with each of the plurality of objects, wherein pre-training the learning model comprises:

configuring a transfer learning model based on the contextual label map, wherein configuring the transfer learning model comprising:

creating a plurality of object classes to be detected;

computing a domain specific contextual feature map for the plurality of object classes;

executing an activation map corresponding to the domain specific contextual feature map to obtain a plurality of bounding boxes corresponding to the plurality of object classes; and constructing a faster Convolutional Neural Network (CNN) architecture with the configured transfer learning model, wherein the faster CNN is pre-trained until a predefined detection threshold, wherein the construction of the faster CNN is performed by:

a first layer of the faster CNN is an input layer and the domain specific contextual feature map from the transfer learning model given as input to the input layer of the faster CNN;

a second layer of the faster CNN is a convolution layer, wherein the second layer is controlling a receptive field, wherein the second layer is an activation feature map;

a third layer of the faster CNN is an output layer, wherein the output layer comprises two sibling output layers;

a fourth layer of the faster CNN is the transfer learning model, wherein the fourth layer is implemented using a Region Proposal Network (RPN).

* * * * *